(12) United States Patent
Benson et al.

(10) Patent No.: US 7,650,418 B2
(45) Date of Patent: *Jan. 19, 2010

(54) SYSTEM AND METHOD FOR CONTROLLING THE USAGE OF DIGITAL OBJECTS

(75) Inventors: Greg Benson, La Jolla, CA (US); Edward Hackbarth, Stockton, CA (US)

(73) Assignee: Macrovision Corporation, Santa Clara, CA (US)

(*) Notice: Subject to any disclaimer, the term of this patent is extended or adjusted under 35 U.S.C. 154(b) by 336 days.

This patent is subject to a terminal disclaimer.

(21) Appl. No.: 10/928,472

(22) Filed: Aug. 26, 2004

(65) Prior Publication Data

US 2005/0027860 A1    Feb. 3, 2005

Related U.S. Application Data

(63) Continuation of application No. 09/620,781, filed on Jul. 21, 2000, now Pat. No. 6,813,640, which is a continuation of application No. 09/456,796, filed on Dec. 8, 1999, now abandoned.

(60) Provisional application No. 60/111,496, filed on Dec. 8, 1998.

(51) Int. Cl.
*G06F 15/16* (2006.01)

(52) U.S. Cl. ............................ 709/229; 709/223; 707/9

(58) Field of Classification Search ............... 709/225, 709/226, 229, 223; 707/9
See application file for complete search history.

(56) References Cited

U.S. PATENT DOCUMENTS 5,845,281 A    12/1998   Benson
5,915,115 A *  6/1999    Talati ..................... 717/155
5,960,004 A    9/1999    Ramstron et al.
6,003,087 A    12/1999   Housel, III et al.
6,006,332 A    12/1999   Rabne et al.
6,085,191 A    7/2000    Fisher et al.
6,128,602 A    10/2000   Northington et al.
6,138,119 A    10/2000   Hall et al.
6,175,869 B1   1/2001    Ahuja et al.
6,182,141 B1   1/2001    Blum et al.
6,314,409 B2   11/2001   Schneck et al.
6,317,742 B1   11/2001   Nagaratnam et al.
6,363,486 B1   3/2002    Knapton, III
6,493,754 B1   12/2002   Rosborough et al.
6,813,640 B1 * 11/2004   Benson et al. ............... 709/229
2001/0021926 A1 9/2001   Schneck et al.

FOREIGN PATENT DOCUMENTS

WO    WO-0135279    5/2002

* cited by examiner

*Primary Examiner*—Oanh Duong
(74) *Attorney, Agent, or Firm*—Haynes and Boone, LLP

(57) ABSTRACT

A system and method for managing the use and access of digital data objects are provided. Control rights associated with a digital data object activate an external control object and an intercept application to intercept and monitor communications between a hosting application and a document server application associated with the creation of the digital data object. These intercepting and monitoring functions are performed without affecting or changing the hosting application or the document server application. The external control object activates an intercept application which mimics the functions of the document server application and performs user actions on the digital data object as authorized by the external control object according to the control rights associated with the digital object. By intercepting and monitoring user actions on a digital data object, the invention can control access and use of the digital data object.

19 Claims, 12 Drawing Sheets

SYSTEM AND METHOD FOR CONTROLLING THE USAGE OF DIGITAL OBJECTS

CROSS-REFERENCE TO RELATED APPLICATIONS

This is a continuation of U.S. patent application Ser. No. 09/620,781, filed Jul. 21, 2000, which was a continuation of U.S. patent application Ser. No. 09/456,796, filed on Dec. 8, 1999, which in turn claimed priority to U.S. Provisional Application No. 60/111,496, filed on Dec. 8, 1998, now abandoned, the contents of which are incorporated by reference herein for all purposes.

BACKGROUND OF THE INVENTION

1. Field of the Invention

The field of the invention pertains to a system and a method for controlling the usage of digital objects. Further, the invention extends to a system and a method for controlling the usage of digital objects in hardware and software components.

2. Description of the Related Technology

In the field of computing, components in an application are objects that (i) usually perform an isolated and specific function, (ii) include an implementation of this functionality, and (iii) include a well-defined interface that is used to interact with, and keep the implementation hidden from, the outside world. Such components exist at all levels in computing machines or systems, from the most basic hardware parts to the most sophisticated and abstract software levels.

FIG. 1 illustrates a typical model for a software component. Once a software application, such as a digital component 100 shown in FIG. 1, is compiled and linked into executable binary code, a user cannot make changes to the way the application behaves other than what has been identified and implemented by the application's design team.

FIG. 2 depicts a simple component interaction in a digital system application 190. The application 190 has a first component 200 and a second component 202. The first component 200 has an interface 206 that is used to communicate with an interface 208 of the second component 202. It is noted that the application 190 may be composed of any number of components and that there may be any number of interactions between the components. If the application 190 is implemented in software, the operation of the software is statically set once the software source code is translated into executable code.

Therefore, users and data publishers are reliant upon the original application designers to adequately define how an application will function. However, application designers cannot always predict the ways a user of the application may want to work with the application, or the ways a publisher of data for such applications may want the application to behave when using the data. Application designers can only make an educated guess as to the answers to these questions.

Therefore, there is a need for a system and a method for controlling the usage of digital objects for statically defined applications. Moreover, there is a need for an extensible system that will provide for the control of the usage of digital objects.

SUMMARY OF THE INVENTION

The system of the present invention has several features, no single one of which is solely responsible for its desirable attributes. Without limiting the scope of this invention, certain aspects and embodiments are presented below.

One embodiment of the invention includes a method of intercepting a communication between two applications in a computer environment, the method comprising intercepting a data communication between a first application and a second application without changing the functionality of the first application and the second application, wherein the first and second applications communicate via a predefined communication channel, providing a control object capable of specifying an action depending on the data communication, and performing the action specified by the control object on a digital object created by an application.

Another embodiment of the invention includes controlling the data communications of the first and/or second applications utilizing the same method of communication interception and external control agent, thereby controlling usage of the first and/or second application.

Another embodiment of the invention includes a method of controlling the usage of a data object, including providing a set of rules regarding the permitted usage of a data object, and determining whether an action is permitted based upon the rules, and depending on the determination, performing the action.

Yet another embodiment of the invention includes a method of controlling the usage of a digital object, including providing a set of rules regarding the permitted usage of a digital object, requesting authorization from another application to perform an action related to the digital object, and depending on the authorization, performing the action.

Yet another embodiment of the invention includes a method of controlling the usage of a digital object, including providing a set of rules regarding the permitted usage of a digital object, and performing an action described by the rules. The action can include monitoring the usage of the digital object by a second application. Further, the action can be performed in substitution or in augmentation of the first action. The second action can also include filtering the action or negotiating authorization for the execution of the action.

DETAILED DESCRIPTION OF THE
EMBODIMENTS OF THE INVENTION

The following detailed description is directed to certain specific embodiments of the invention. In this description, reference is made to the drawings wherein like parts are designated with like numerals throughout.

System Overview

This present invention provides arbitrary and dynamic control to completed applications. The system of the invention operates with component-based applications, with applications with a pre-defined communications channel between them, or with applications created with the present invention in mind, that may be implemented in either hardware or software.

Figure 3:
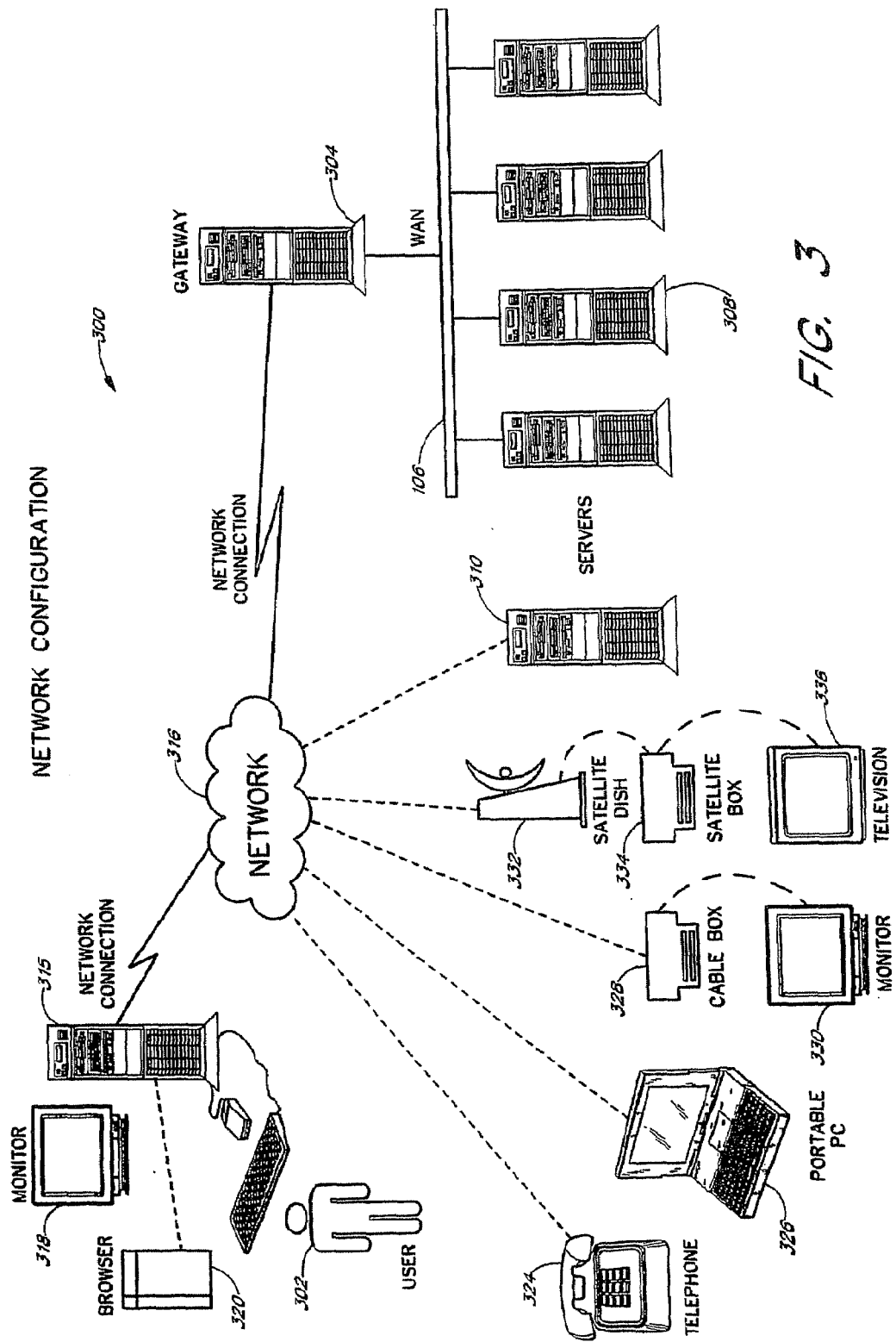
FIG. 3 is a block diagram illustrating one network configuration that comprises a client computer and a server computer that are connected via a network.

Referring to FIG. 3, an exemplary network configuration 300 will be described. A user 302 communicates with a computing environment which may include multiple server computers 308 or single server computer 310 in a client/server relationship on a computer network 316. In a client/server environment, each of the server computers 308, 310 includes a server program which communicates with a client computer 315.

The server computers 308, 310, and the client computer 315 may each have any conventional general purpose single- or multi-chip microprocessor such as a Pentium® processor, a Pentium® Pro processor, a 8051 processor, a MIPS® processor, a Power PC® processor, or an ALPHA® processor. In addition, the microprocessor may be any conventional special purpose microprocessor such as a digital signal processor or a graphics processor. Furthermore, the server computers 308, 310 and the client computer 315 may be desktop, server, portable, hand-held, set-top, or any other desired type of configuration. Furthermore, the server computers 308, 310 and the client computer 315 each may be used in connection with various operating systems such as: UNIX, LINUX, Disk Operating System (DOS), OS/2, Windows 3.X, Windows 95, Windows 98, and Windows NT.

The server computers 308, 310, and the client computer 315 may each include a network terminal equipped with a video display, keyboard and pointing device. In one embodiment of network configuration 300, the client computer 315 includes a network browser 320 that is used to access the server computer 310. In one embodiment of the invention, the network browser 320 is the Internet Explorer, licensed by Microsoft Inc. of Redmond, Wash.

The user 302 at the computer 315 may utilize the browser 320 to remotely access the server program using a keyboard and/or pointing device and a visual display, such as a monitor 318. It is noted that although only one client computer 315 is shown in FIG. 3, the network configuration 300 can include many client computers as may be associated with a global computer network.

The network 316 may include any type of electronically connected group of computers including, for instance, the following networks: a virtual private network, a public Internet, a private Internet, a secure Internet, a private network, a public network, a value-added network, an intranet, and the like. In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). The network 316 may connect to the client computer 315, for example, by use of a modem or by use of a network interface card that resides in the client computer 315.

The server computers 308 may be connected via a wide area network 306 to a network gateway 304, which provides access to the wide area network 306 via a high-speed, dedicated data circuit.

Devices, other than the hardware configurations described above, may be used to communicate with the server computers 308, 310. If the server computers 308, 310 are equipped with voice recognition or DTMF hardware, the user 302 can communicate with the server programs by use of a telephone 324. Other connection devices for communicating with the server computers 308, 310 include a portable personal computer 326 with a modem or wireless connection interface, a cable interface device 328 connected to a visual display 330, or a satellite dish 332 connected to a satellite receiver 334 and a television 336. For convenience of description, each of the above hardware configurations are included within the definition of the client computer 315. Other ways of allowing communication between the user 302 and the server computers 308, 310 are envisioned.

Further, it is noted the server computers 308, 310 and the client computer 315, may not necessarily be located in the same room, building or complex. In fact, the client computer 315 is generally remotely located from the server computers 308, 310.

Figure 4:
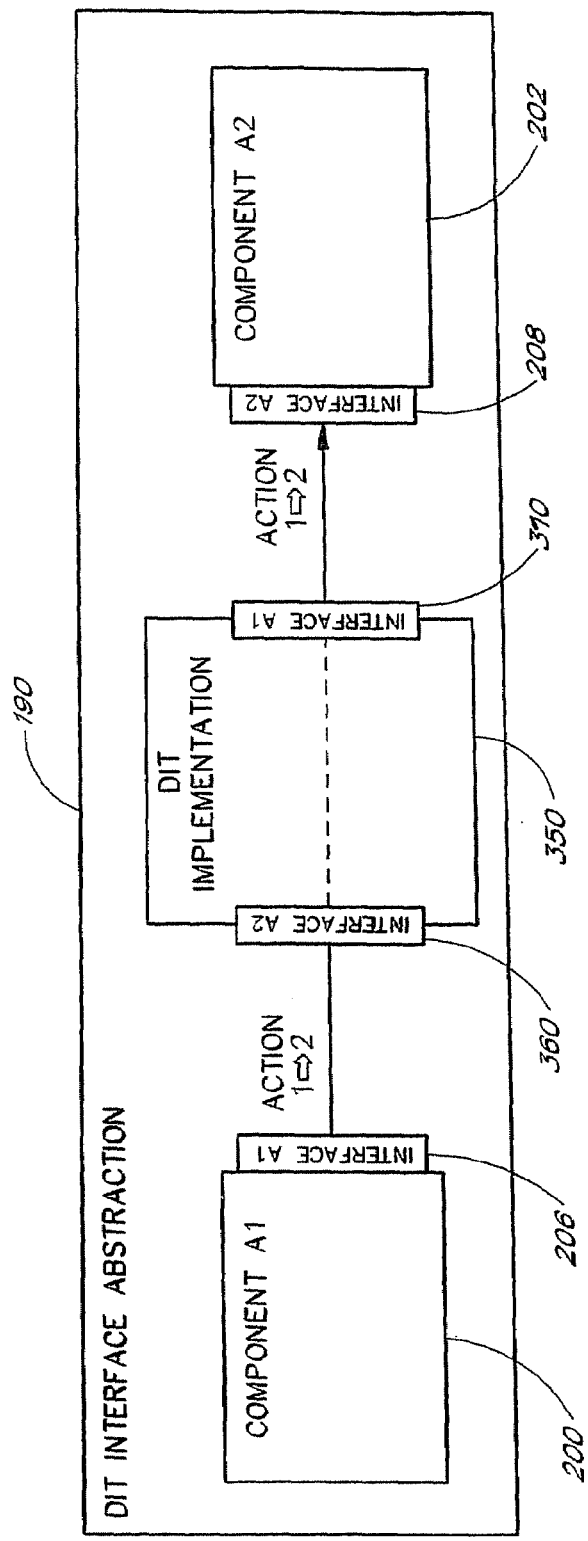
FIG. 4 is a high-level block diagram illustrating a discreet intercept technology (DIT) component of the present invention that is integrated into the communication pathway between two digital components.
Figure 5:
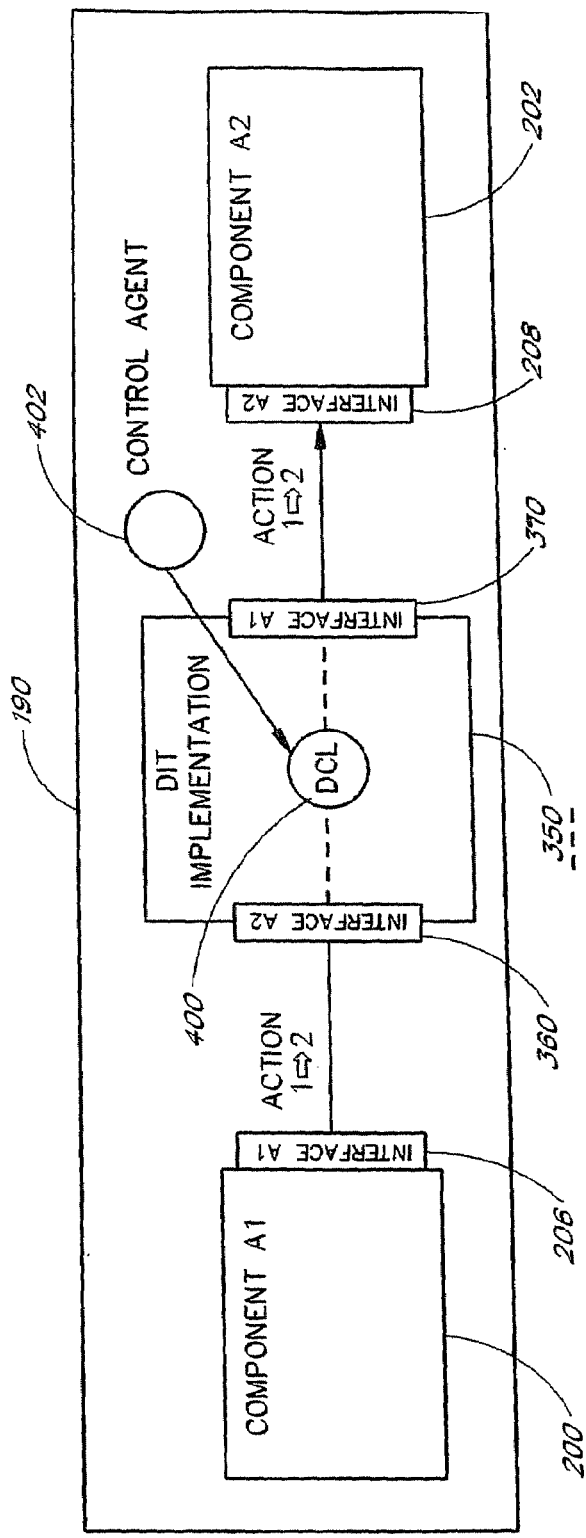
FIG. 5 is a block diagram illustrating the relationship between a dynamic control logic (DCL) component of the present invention and the DIT of FIG. 4.

FIGS. 4 and 5 illustrate one embodiment of the system of the invention. The system includes two components: a discreet intercept technology component (DIT) 350 and a dynamic connection logic component (DCL) 400. The DIT 350 is the component that permits the interception of communication and data flows between two or more components in component-based applications.

The DCL 400 is the component that enacts control scenarios specified by a control object, or, more specifically, an external control agent 402. The DCL 400 is used in new applications to enact arbitrary and dynamic control. It is used with the DIT 350 to enact arbitrary and dynamic control in pre-existing component-based applications. The external control agent 402 may be any type of data control system, such as, for example, is disclosed in U.S. Pat. No. 5,845,281 to Benson, et al., which is incorporated by reference herein. The DCL 400 supports at least five control scenarios, including: substitution, augmentation, filtering, negotiation and monitoring. Each of these scenarios is discussed in further detail below.

In combination, the DIT 350 and the DCL 400 provide the ability to dynamically alter the interactions between components of applications without requiring a re-design of the components. The DIT 350 and the DCL 400 can be integrated into any digital component system or application. Further, the DIT 350 and DCL 400 can be implemented using any object model, such as the Microsoft Component Object Model (COM), the Microsoft Distributed COM (DCOM), the Sun Java Bean Architecture, the IBM System Object Model (SOM), or the Component Object Resource Broker Architecture (CORBA). By way of example, a description of the DIT 350 and the DCL 400 is set forth below using the Microsoft COM and the Microsoft Active Document technology.

As can be appreciated by a skilled technologist, the DIT 350 and the DCL 400 may be partitioned into various subroutines, procedures, definitional statements, and macros. In addition, source code modules may be separately compiled and linked into a single executable program. Therefore, the following description of the DIT 350 and the DCL 400 is used for convenience to describe their functionality. Further, the DIT 350 and the DCL 400 may optionally be implemented in hardware.

Glossary

For the convenience of the reader, definitions for some of the terms of the present invention are set forth below.

DIT—a system for intercepting an action that is passed between two digital components.

Action in—incoming (into the DIT) component actions.

Action out—outgoing (out of the DIT) component actions.

Intercepted action stream—internal representation of intercepted 'In-Actions'.

Source interface abstraction—an interface in the DIT that mimics a source component interface of a particular action stream.

Sink interface abstraction—an interface in the DIT that mimics a receiving component interface of a particular action stream.

External control agent—an object that provides the DCL with dynamic information and identification of external control logic required to implement a desired control scenario.

Dynamic connection logic (DCL)—logic that implements a desired dynamic interaction control scenario.

Externally directed actions—intercepted or newly initiated action streams directed out from DCL implementation to external (external to DCL affected application/system) components or systems.

External return actions—results of actions from the external system/components directed back to the external connection logic within a DCL implementation.

Source component—Component in digital system initiating actions to be intercepted.

Sink component—Component in digital system receiving actions that have been intercepted.

System Operation

Discreet Intercept Technology

Figure 6:
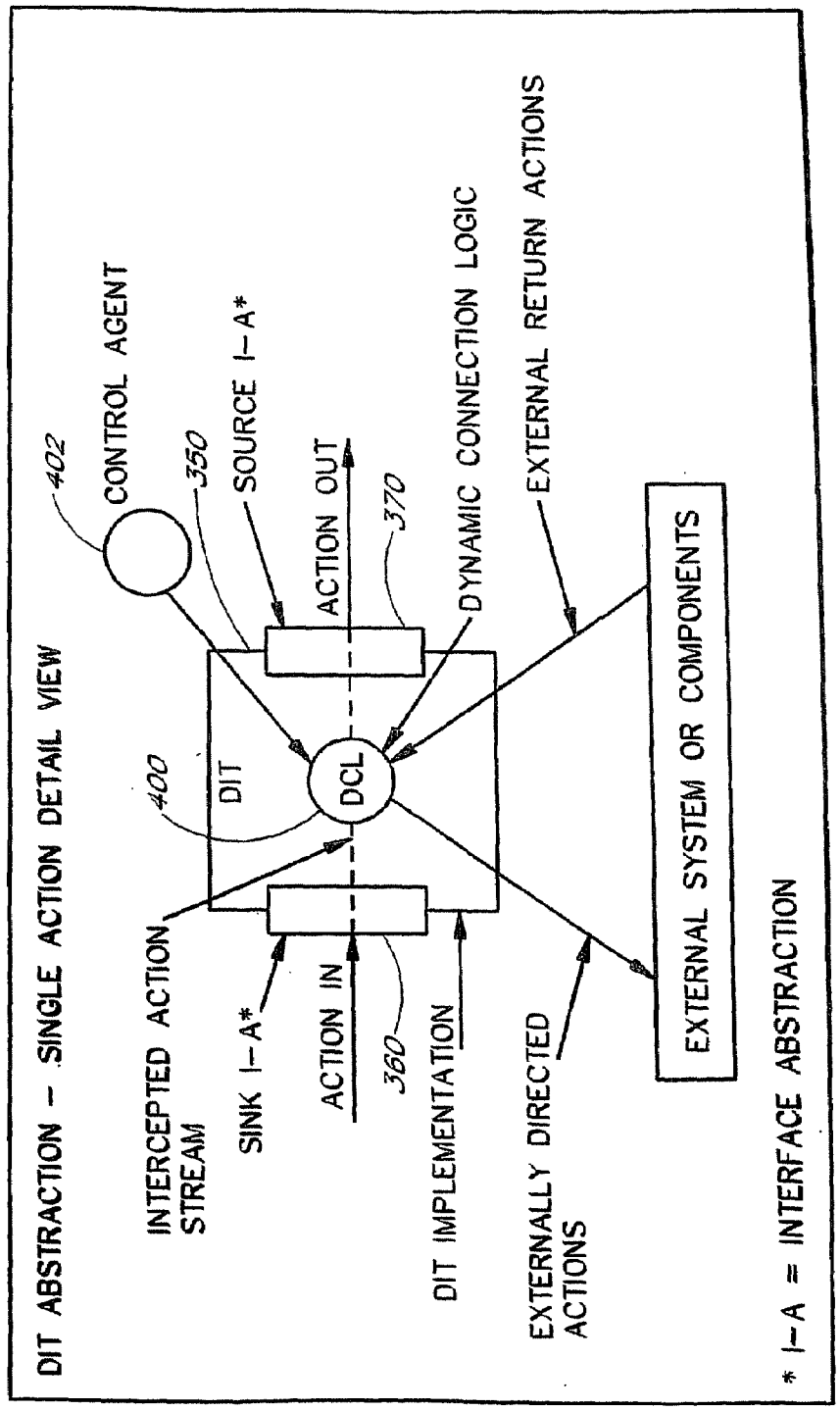
FIG. 6 is a detailed block diagram illustrating the internal components of the DIT of FIG. 5.

FIGS. 4 through 6 illustrate the DIT 350, the DCL 400 and the external control agent 402. The DIT 350 of the present invention abstracts the interfaces and interactions between two or more components by providing some or all of the interface of each component to the other components involved in the interaction. The DIT 350 is inserted between two digital components, intercepting data and communications, and thereby controlling the normal and expected communication between these digital components. The DCL 400 and an external control agent 402 may be arbitrarily designed to determine the degree and type of control effected.

Figure 1:
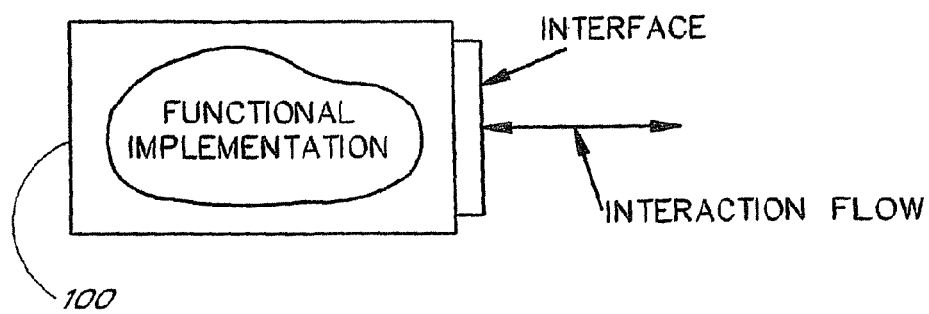
FIG. 1 is a block diagram showing an interface of a digital component.
Figure 2:
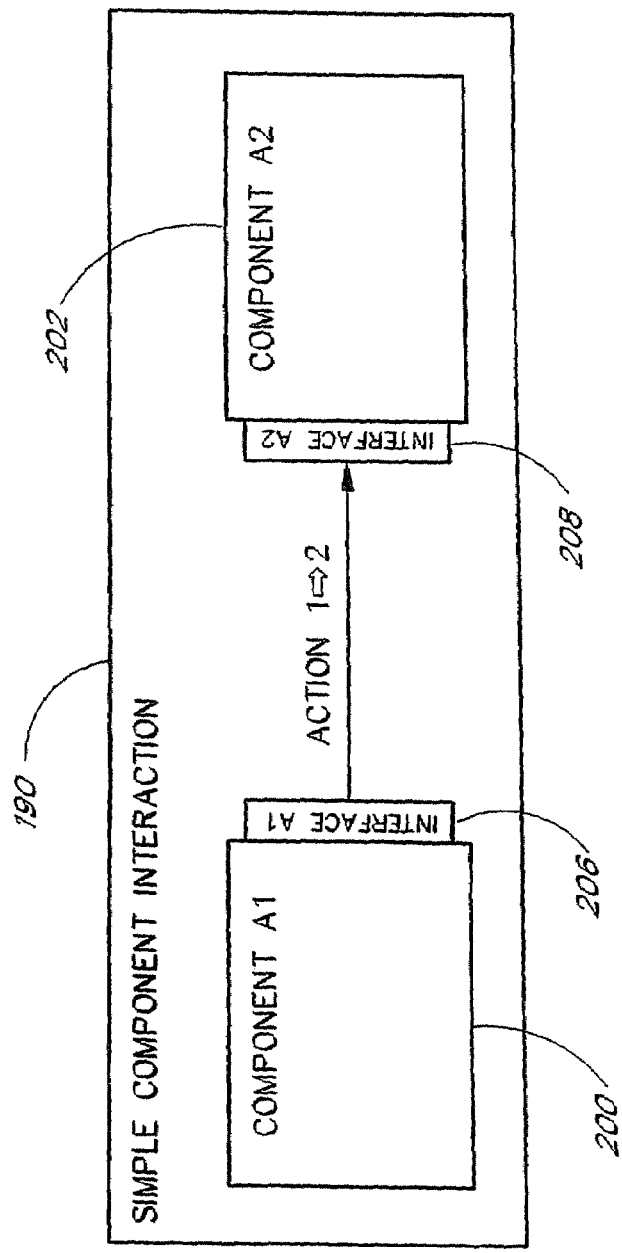
FIG. 2 is a block diagram illustrating a communication pathway between two digital components.

FIG. 4 shows the same component interaction of FIG. 2 with the exception that the communication is being intercepted by the DIT 350. The DIT 350 includes a first interface 360 that mimics the interface 208 of the second component 202. The DIT 350 also includes a second interface 370 that mimics the interface of the first component 200. The dashed line through the DIT 350 of FIG. 4 indicates the normal flow of a communication ("action") between the component 200 and the component 202.

Dynamic Connection Logic

The DCL 400 (FIG. 5) enables applications to be altered in a flexible and dynamic fashion, after they have been created and subsequently distributed to the user. Using the DCL 400, in association with the DIT 350, pre-defined component-based applications that were designed with only specific behavior and attributes in mind can be enhanced or otherwise altered with additional functionality and new control techniques. In addition, the use of components within such applications may be controlled.

The DCL 400 uses the external control agent 402 (FIG. 5) to specify logic flags and instructions to control the usage of data and/or functions that are used or are part of the pre-defined components 200 and 202. The DCL 400 and the external control agent 402 may be local to one another, may reside in separate processes on a single system or may be remote from each other in all ways that this is possible in digital computing networks and environments.

The DCL 400 and external control agent 402 communicate to each other through a pre-defined applications program interface ("API") specific to passing control and action information back and forth to each other. The API is specific to particular implementations of DIT/DCL embodied systems (FIG. 5), but will include methods and means for providing to the external control agent: detected action information, the data captured; and from the external control agent 402 to the DCL 400: a course of action(s) to take (or logical values identifying a course of action or actions), and data passed back.

It is noted that the DCL 400 can be applied to any application where flexible and dynamic control of data and communications is desired, and not only in component-based systems. Thus, in one possible system implementation, the DCL 400 can be used without the DIT 350 (FIG. 5).

FIG. 5 depicts the DCL 400 facilitating component interaction control in connection with the DIT 350. The DCL 400 uses information from at least two sources to determine how to handle a specified action. First, the DCL 400 receives instructions regarding which actions are to be intercepted. In one embodiment of the invention, this information is provided by the external control agent 402. In another embodiment, a DIT/DCL system (FIG. 5) may include the implementation of the external control agent 402 functionality in the implementation of the DCL 400. Second, the DCL 400 receives handling information regarding how to process an intercepted action.

Figure 7:
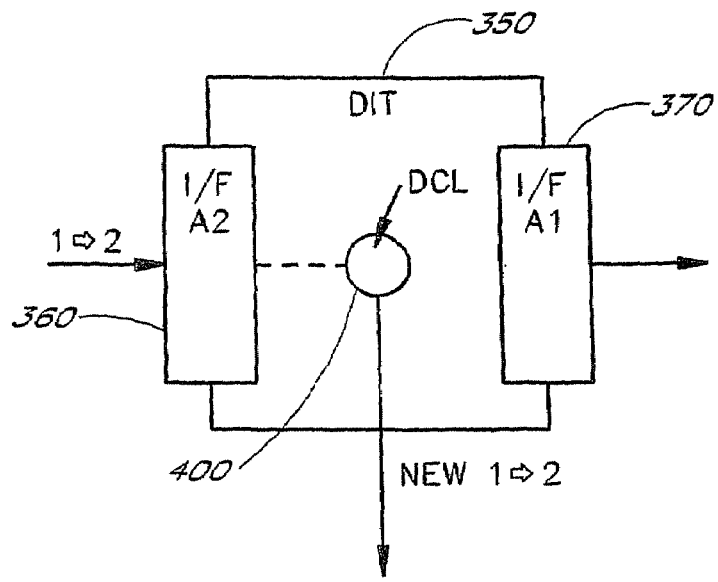
FIG. 7 is a block diagram illustrating the dataflow in the DIT component for the substitution of an action between the two digital components of FIG. 5.

FIGS. 7 through 11 illustrate control scenarios that may be enforced by the DCL 400. FIG. 7 illustrates the dataflow of a substitution of an action by the DCL 400. After the first component 200 (FIG. 4) attempts to cause the execution of a first action, the DCL 400 substitutes a request for a second action, for the first action.

Figure 8:
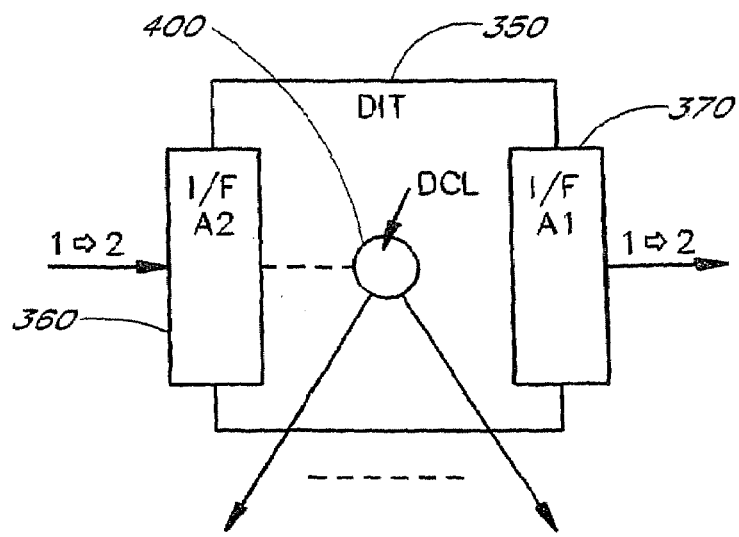
FIG. 8 is a block diagram illustrating the dataflow in the DIT component for the augmentation of an action between the two digital components of FIG. 5.

FIG. 8 illustrates the dataflow of an augmentation of an action by the DCL 400. The first component 200 attempts to cause the execution of a first action. However, the DCL 400 performs one or more additional actions, in addition to the first action.

Figure 9:
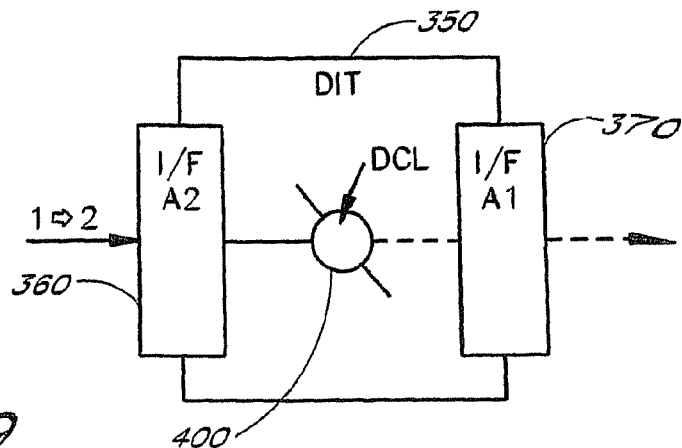
FIG. 9 is a block diagram illustrating the dataflow in the DIT component for the filtering of an action between the two digital components of FIG. 5.

FIG. 9 illustrates the dataflow of a filtering of an action by the DCL 400. After receiving the action request, the DCL 400 can decide whether to allow the action to proceed. In this implementation, the DCL 400 acts as an action request switch that selectively enables or disables the dataflow to the second component 202. As shown by the "valve" diagram of the DCL 400 of FIG. 9, the action request from the first component 200 was filtered out and not forwarded to the second component 202.

Figure 10:
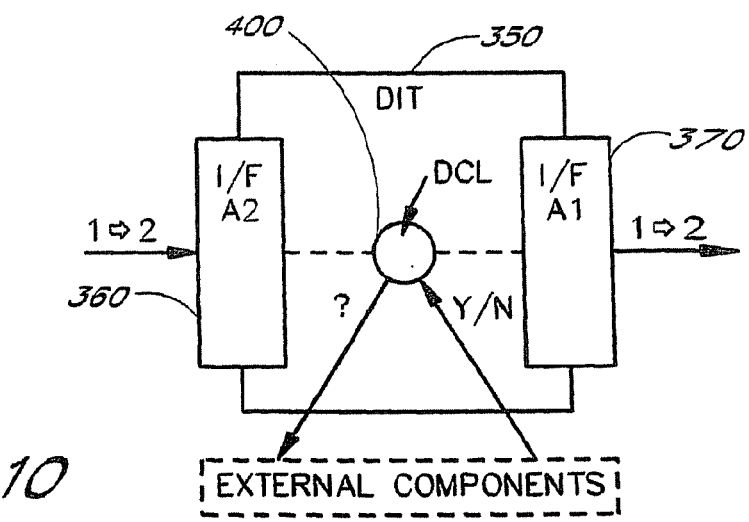
FIG. 10 is a block diagram illustrating the dataflow in the DIT component for the negotiation of an action between the two digital objects of FIG. 5.

FIG. 10 illustrates the dataflow of a negotiation of an action by the DCL 400. After receiving the action request, the DCL 400 checks one or more external components, such as the external control agent 402, to determine whether the action can proceed. The external components may request additional information from the first component 200 or another source before allowing the action request to be fed to the second component 202. The external components may be configured to perform any of a variety of functions, such as, for example: require a payment before the action proceeds thereby enabling on-line shopping for the use of an object, perform a security check to determine the identity of the requester of the action, perform a database compare between two or more sources of data, or determine whether the client is authorized to perform the action, i.e., authenticating the user, an object, or a digital certificate.

Figure 11:
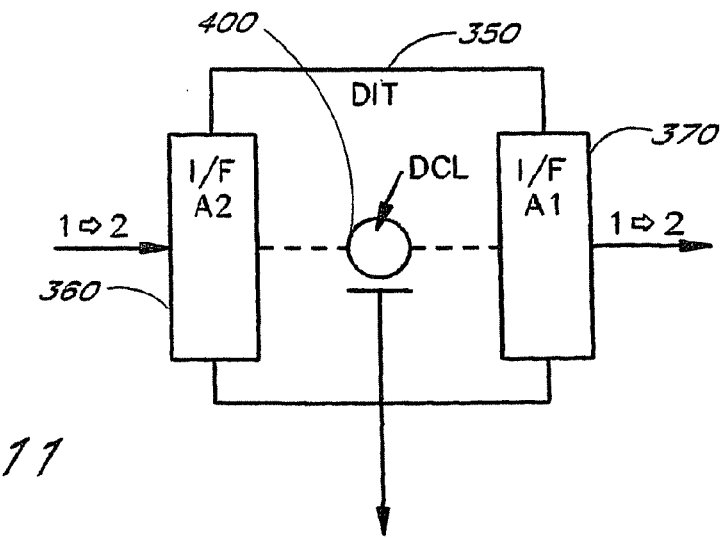
FIG. 11 is a block diagram illustrating the dataflow in the DIT component for the monitoring of an action between the two digital components of FIG. 5.

FIG. 11 illustrates the dataflow of a monitoring scenario by the DCL 400. After receiving the action request from the first component 200, the DCL 400 sends notification to one or more external components, such as the external control agent 402, that the action was requested. In this way, the usage and requested actions of the second component 202, may be monitored.

In one possible embodiment of the invention, the external components identified in FIGS. 6-10 may be implemented within the external control agent 402.

Figure 12:
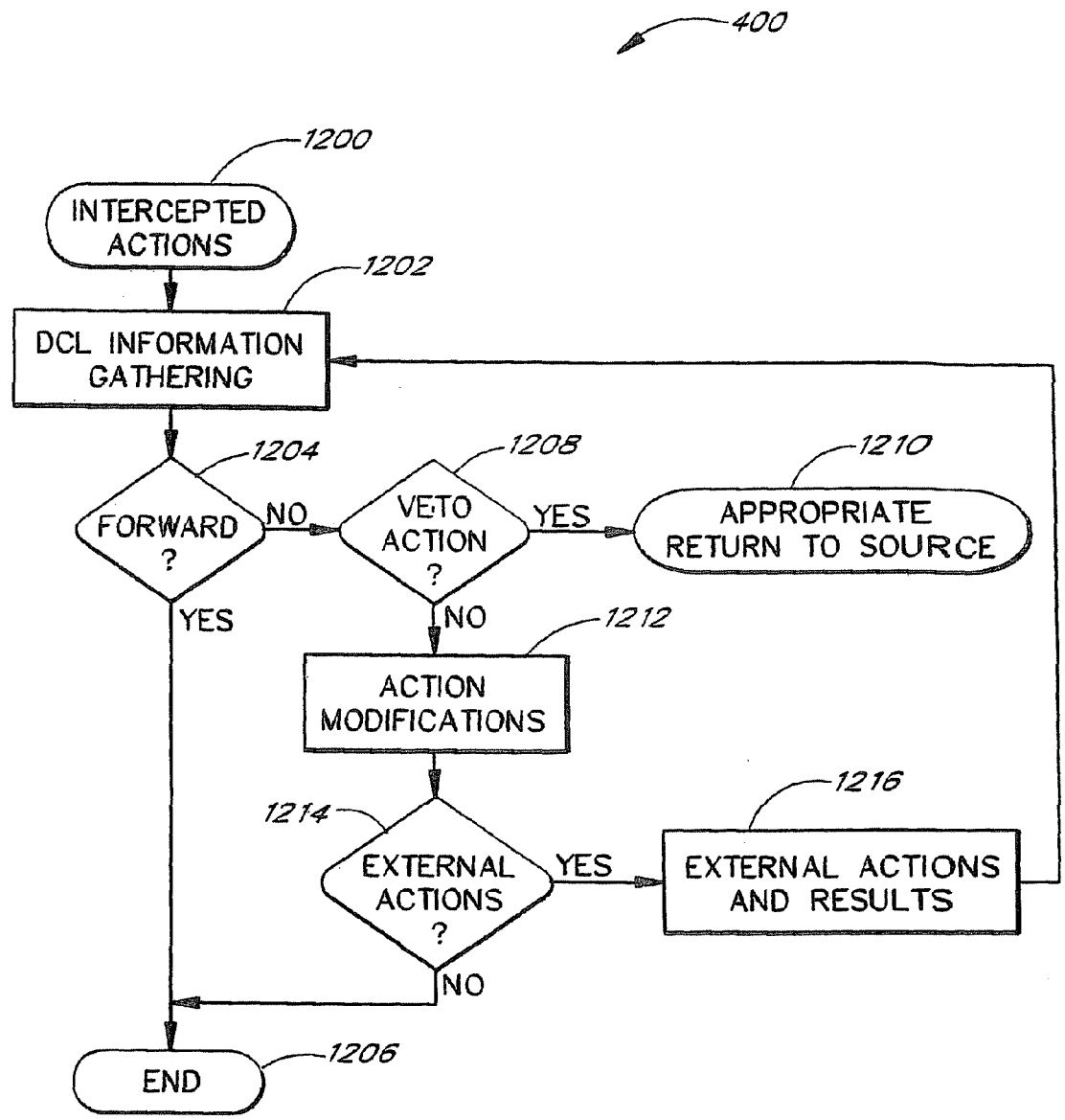
FIG. 12 is a flowchart illustrating the control process of the DCL shown in FIG. 5.

FIG. 12 illustrates the control process of the DCL 400 (FIG. 4). Starting at a state 1200, the DCL 400 receives an intercepted action that was sent from the first component 200 (FIG. 4) to the second component 202 (FIG. 4). Next, at a state 1202, the DCL 400 gathers information from several sources that are set forth below. The DCL 400 requests the external control agent 402 (FIG. 4) to send a list of the actions that are to be handled, an action plan for the actions, and a specification of external components (FIG. 10) that may be called pursuant to the action plan. The DCL 400 also gathers information from the external components, such as an operating system or from the Internet. Also, the DCL 400 obtains application information from the application 190 (FIG. 2). Application information can include state information, events or actions, and any other information specific to the application 190. The DCL 400 uses this information in determining how to handle intercepted actions.

Next, at a decision state 1204, the DCL 400 determines, based upon the gathered information, whether to forward the intercepted action unaltered (1206) or to perform some other activity (states 1208-1214).

If the DCL 400 decides to forward the action, the DCL 400 proceeds to a state 1206 and ends. Otherwise, the DCL 400 proceeds to a decision state 1208. At the state 1208, the DCL 400 determines whether to veto the action. If the DCL 400 decides to veto the action, the DCL 400 proceeds to a state 1210 and returns an appropriate message to the first component 200.

Otherwise, if the DCL 400 decides not to veto the action, the DCL 400 proceeds to a state 1212. At the state 1212, the DCL 400 can perform one or more action modifications depending on the information gathered in the state 1202. It is noted that the action modification can be tailored to the application 190 (FIG. 4) and the intercepted action. The DCL 400 supports at least four additional activities, including:

(i) substituting the action for another action (shown in FIG. 7); (ii) modifying the action (shown in FIGS. 7 and 8); (iii) consulting the external control agent 402 to determine whether to allow the action (shown in FIG. 10); and (iv) forwarding notice of the action to the external control agent 402 for some activity such as monitoring (shown in FIG. 11).

For example, if the first component 200 was a word processor, and the second component 202 was a spell-checking program, the request for the spell-checking program from the word processor could be re-directed to a second spell-checking program. Further, assuming the first component 200 was a graphics utility and the second component 202 was a printing routine for a graphics object in the graphics utility, in an intercepted request for the printing of the graphics object, the DCL 400 could append an advertisement to the graphics object.

Moving to a decision state 1214, the DCL 400 may, depending on the gathered information, perform some external action. For example, the DCL 400 may send notice of the requested action to an accounting system (not shown) to debit a client's account for the requested action. Alternatively, a monitoring system (not shown) may be notified that the action was attempted.

If the DCL 400 determines to perform an additional action, the DCL 400 proceeds to the state 1216 wherein the external action is implemented. From the state 1216, the DCL 400 returns to the state 1202. Otherwise, if no external actions are to be performed, the DCL 400 ends at the state 1206.

Using DIT and DCL under the Active Document Server Specification

This section describes the use of the DIT 350 (FIG. 4) and DCL 400 (FIG. 4) in connection with Microsoft's Active Document Specification. In this system, the DCL 400 enforces security features relating to the usage of data objects of applications that are written using the Active Document Specification. The Active Document Specification is built upon the Microsoft Component Object Model (COM) architecture and is part of Microsoft's Object Linking and Embedding (OLE) family of technologies. The Active Document Specification is designed to allow a hosting application to embed documents from other applications in the hosting application. For example, Microsoft Word can host a Microsoft Excel spreadsheet that is within a Microsoft Word document. Under the Active Document Specification, a user can work on an embedded document, within the hosting application, without having to move to a separate application window. Additional information regarding the Active Document Specification can be found in the Active Documents Overview as presently located at http://msdn.microsoft.com/library/devprods/vs6/visualc/vccore/coreactivexdocuments.htm, "Understanding ActiveX and OLE" by David Chappell (Chapter 11), and "Inside OLE", 2nd edition, by Brockschmidt.

Figure 13:
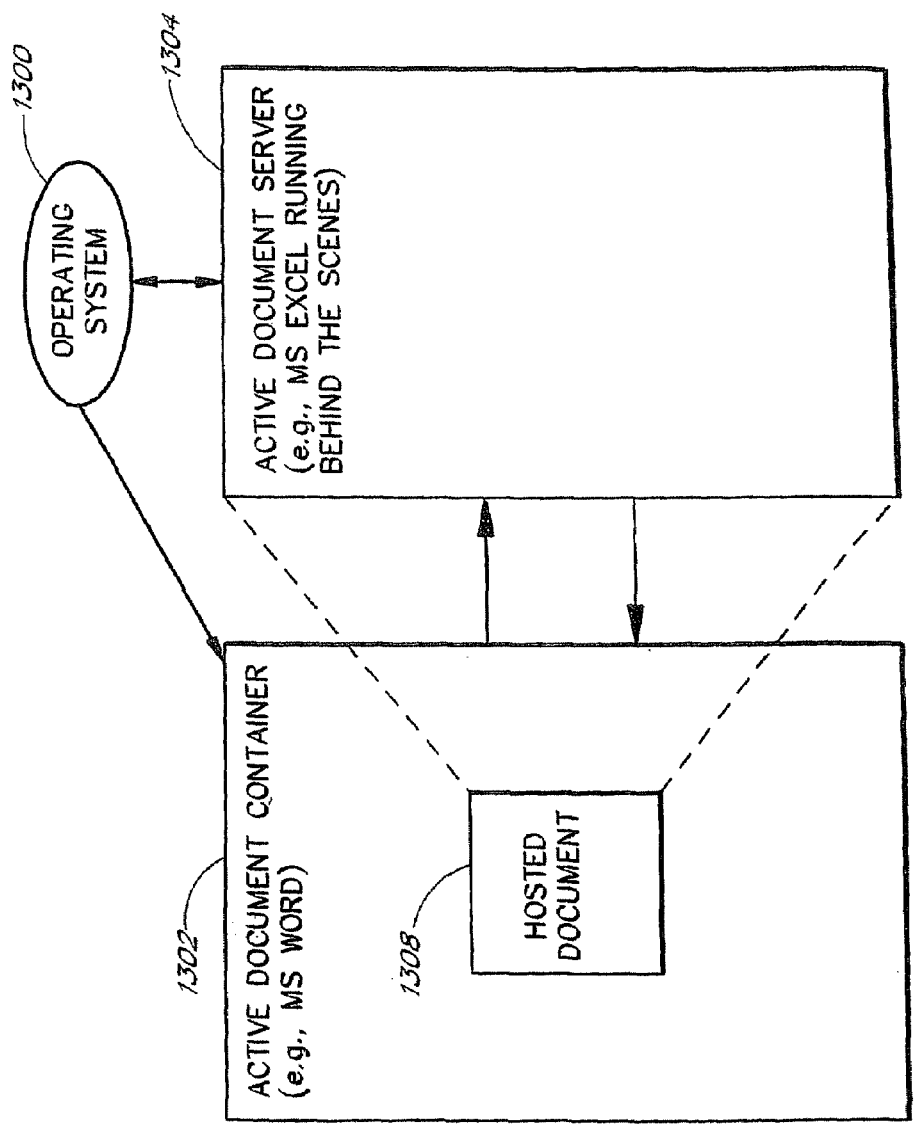
FIG. 13 is a block diagram illustrating an active document system.

FIG. 13 illustrates a diagrammatic overview of the Active Document architecture. According to the Active Document Specification, an application can register itself with an operating system 1300 as being the handler for a selected type of document 1308. Document 1308 can be a digital object containing one or more content elements such as textual, graphical, and audio data. For example, document 1308 could be a Microsoft Excel spreadsheet or a graphical image. Registration can involve adding entries to the system registry which identify a particular Active Document Server for files with a particular extension, assigning a unique class identification ("CLSID)") that identifies the Active Document Server, and adding shell commands identifying how actions are to be handled for documents related to this Active Document Server. A CLSID is a 128 bit number that is guaranteed to be globally and temporally unique.

In accordance with the Active Document Specification, an Active Document Server negotiates with its hosting Active Document Container for the use of some part of its window space. The Active Document Server also negotiates the incorporation of menu items into the Active Document Container's menus. As a result of these negotiations, the Active Document Server application appears to be part of the Active Document Container application. In reality, the container and server are distinct and individual component applications. The negotiations are made through a standard set of interfaces defined by the Active Document Specification. When a user of the Active Document Container accesses user interface features related to the hosted Active Document Server application, these interactions are passed on to the Active Document Server application, again through standard interfaces defined in the Active Document Specification. Additional interactions between the Active Document Container and Server are required for the following: notifications from the container to the server about when a user is in the window space of the server, when the server needs to refresh its area of the window, when and where the server should save its data, and when the server should shut down. It is noted that the Active Document Specification defines no inherent data security or access control features for its various defined component and application roles. These features are implemented after-the-fact through the described embodiment of the present invention.

As shown in FIG. 13, Microsoft Word can be the Active Document Container 1302 and Microsoft Excel can be the Active Document Server application 1306. The Active Document Container 1302 can contain any number of documents within itself The Active Document Specification is described in Microsoft's "OLE Document Objects Specification."

The Active Document Container 1302 used in one embodiment of the invention may be the Microsoft Internet Explorer application. Internet Explorer serves as a generic Active Document Container with no default document type of its own. Internet Explorer was designed to be able to host any active document. It does this by hosting in its full window a document served by any Active Document Server written to the Active Document Specification. Unlike other Active Document Container applications, Internet Explorer can only host a single Active Document at any one time. Note that the programming module designated MSHTML on all Windows platforms is the Active Document Server used to host and display HTML documents, or Web pages, as they are more commonly known.

Figure 14:
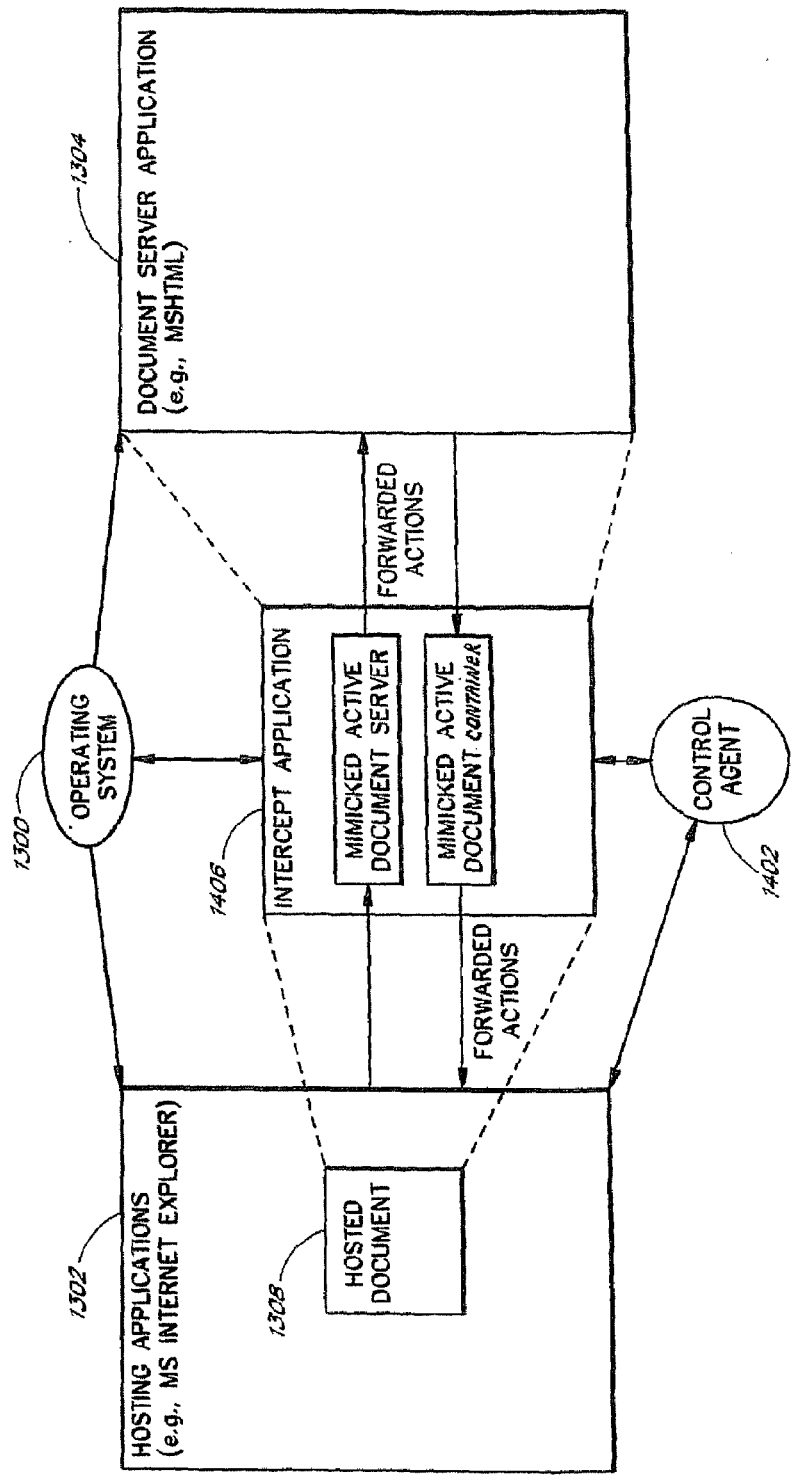
FIG. 14 is a block diagram illustrating an embodiment of the DIT and the DCL of FIG. 5 in the active document system of FIG. 13.

FIG. 14 illustrates a hosting application 1302 that acts as an Active Document Container according to the Active Document Specification. FIG. 14 also illustrates a document server application 1304 that acts as an Active Document Server according to the Active Document Specification. Additionally, FIG. 14 illustrates the DIT 350 and the DCL 400 implemented as an intercept application 1406. The active document server intercept application 1406 supports security features regarding the use of a document 1308. It is noted that the document 1308 can be any type of document under the Active Document Specification. According to the present invention, the Active Document Server 1406 is designated as the handling agent for every type of document that is in need of security regarding its access or its use.

FIG. 14 illustrates that the intercept application 1406 mimics the interfaces of the hosting application 1302 (e.g., Microsoft Internet Explorer) and the document server application 1304 (e.g., MSHTML). It is noted that no changes are required of the existing component applications, namely, Microsoft Internet Explorer and MSHTML. The intercept application 1406 is in communication with the external control agent 402 that controls the usage of the document 1308. In this system embodiment, the external control agent 402 can include the system described in U.S. Pat. No. 5,845,281 to Benson, et al.

Figure 15:
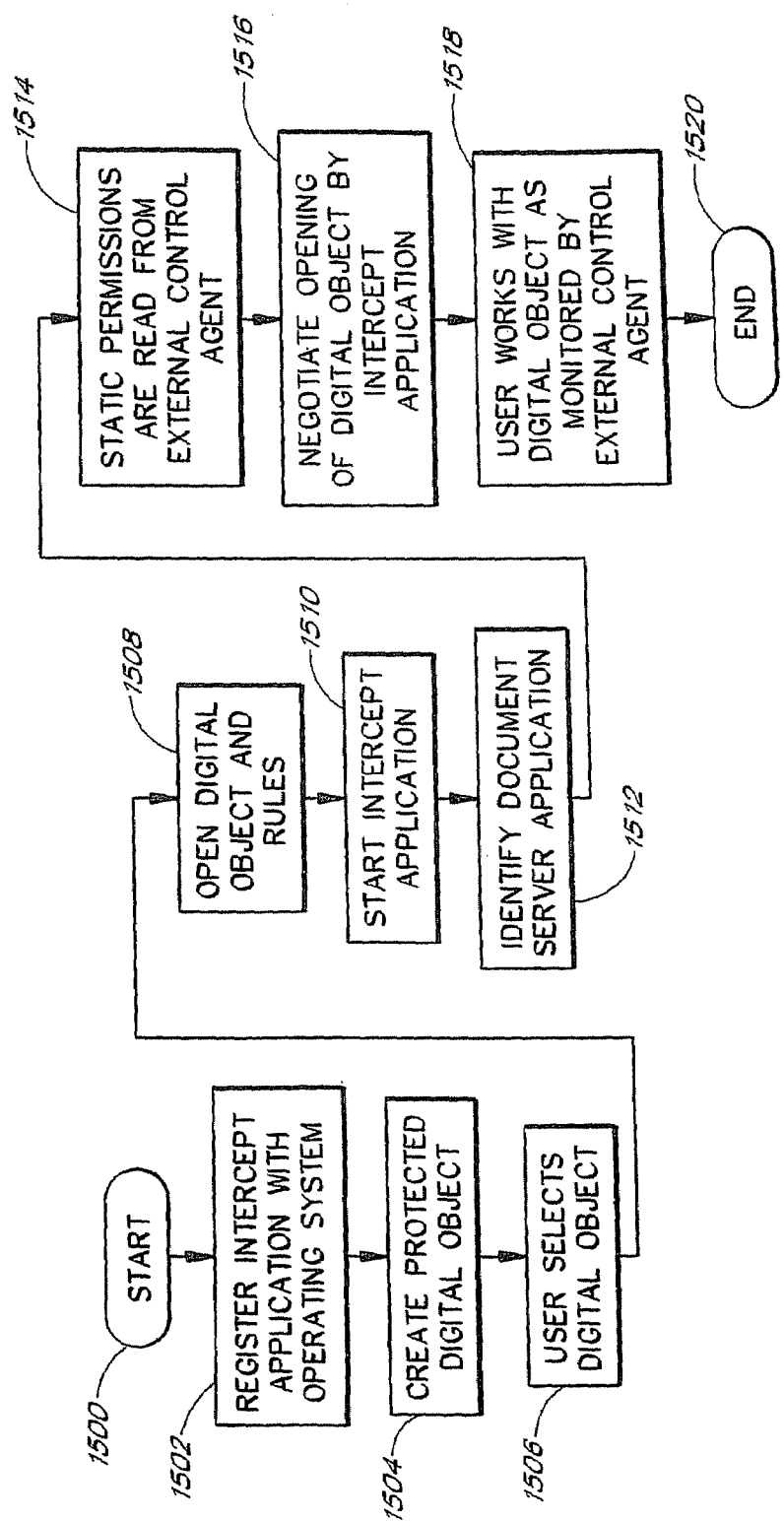
FIG. 15 is a flowchart illustrating the interception and control process of the active document system of FIG. 14.

FIG. 15 is an operational flowchart illustrating a process of using the intercept application 1406 of the present invention. After starting at a state 1500, at a state 1502,the intercept application 1406 is registered with the operating system 1300 as an Active Document Server. This registration involves setting operating system registry settings that identify the intercept application 1406 and its registry settings with documents having a specific extension (in this case ".adt"), associating shell commands for specific actions (such as when a user or a program ask the operating system to open a document with an ".adt" extension), as well as the standard and required registry entries for all Active Document Server applications according to the Active Document Specification, including but not limited to associating the application with a unique CLSID.

Next, at a state 1504, the document 1308 that is to be used in connection with the present invention is created. Under the Active Document Specification, every document contains the CLSID which identifies the correct Active Document Server to be used with that document. Alternatively, when working within the environment of the Microsoft Windows family of operating systems, a document may be associated with its Active Document Server by the file extension used as part of the full filename of the document. This latter method is required for HTML documents that have no standard facility within the HTML specification for incorporating the notion of a Windows platform specific CLSID uniquely identifying an Active Document Server.

In one embodiment of the invention, the document 1308 is created by a media generator (not shown). In another embodiment of the invention, the document 1308 is created by an off-the-shelf active document application, such as Microsoft Excel, Microsoft Word, Microsoft PowerPoint, or Visio 5.0. After the document 1308 is created, or during its creation, the document 1308 is modified to designate the application that created the document 1308. That is, the CLSID of the Active Document Server that created the document 1308 it is added to the document 1308 according to the Active Document Specification. Additionally, or alternatively, the file extension may be appropriately assigned to the document 1308. In this embodiment this is the document server application 1304.

Further, the document is modified to facilitate its use in the secure manner intended by this embodiment of the invention. The modifications consist of re-wrapping the document in a structure that allows for the addition of several new pieces of information. This includes information that identifies the intercept application 1406 that is to be called upon when use of document 1308 is successfully verified. One data area in the new document structure allows for the deposition of the original document 1308 in its entirety, perhaps in a protected form by being, for example, encrypted.

In addition, various rules regarding the usage of the document are provided in connection with the document 1308. In one embodiment of the invention, the rules are encapsulated in the document 1308. In another embodiment of the invention, the rules are provided in a second document. The process for associating rules with a data object is described in further detail in U.S. Pat. No. 5,845,281 to Benson, et al. It is noted that the document 1308 may optionally be created before the intercept application 1406 is registered with the operating system 1300. Finally, the document 1308 has its file extension changed to be associated with the external control agent 402. The external control application is the initial associated application here because of the secure nature of this particular embodiment. The external control agent 402 must verify that the user selecting document 1308 for use is allowed to open the document 1308 before its original content is ever provided to the user.

An exemplary set of rules relating to the usage of the document 1308 include rules for controlling the following operations: opening a document, copying a document, editing a document, printing a document, and saving a document. Continuing to the state 1506, the document 1308 is made accessible to the user and the user selects the object. It is noted that the document 1308 may be provided to the user via the Internet, a computer diskette, or some other transmission medium.

Next, at a state 1508, the external control agent 402 is activated to open the document 1308. This occurs because the final form of the document 1308 was associated with the external control agent 402. The external control agent 402 opens the document 1308 and reads the rules associated with the document 1308. The external control agent 402 also determines whether the document is an Active Document. If the document is an Active Document and if the user is allowed to view the document 1308 according to the rules, then the external control agent 402 proceeds to a state 1510. At state 1510, the external control agent 402 passes a "dummy" file (not shown) to the hosting application 1302 through standard operating system calls. In the Windows vernacular this is called a shell execution.

The dummy file is given the extension identifying the intercept application 1406, ".adt". The shell execution causes the hosting application 1302 to start according to the intercept application's registry settings for an 'open' shell command. Through the shell command, the operating system passes the dummy file to the hosting application 1302. The hosting application 1302 in this embodiment is Microsoft's Internet Explorer application. Internet Explorer serves a special role as an Active Document Container in that it allows the hosted Active Document Server to use its entire window acting in this way as the main application the user sees.

At this point Internet Explorer, the hosting application 1302, determines which Active Document Server it will need to load and host. The dummy file again designates the intercept application 1406 as its acting Active Document Server, through both an embedded CLSID and the appropriate file extension. The hosting application 1302 uses this information and the system registry settings to identify and locate the intercept application 1406. The hosting application 1302 then starts the intercept application 1406 as a subjugated and embedded Active Document Server according to the Active Document Specification, and passes it the dummy file. The dummy file also contains information identifying the document 1308, called the document identifier, within the external control agent 402. The intercept application 1406 then invokes the external control agent 402 to negotiate the opening of the document 1308 through an API to the external control agent 402.

The API of the external control agent 402 consists of two Microsoft Component Object Model (COM) interfaces. The first, IFramework, is required for a general connection to the external control agent 402. A pointer to this interface is retrieved by requesting the operating system to find the running instance of the external control agent 402, asking it for the location of the IFramework interface and returning this to the intercept application 1406. This is a standard COM process in the Windows family of operating systems called CoCreateInstance( ). Through a method called AttachTo Cell( ) in the IFramework interface the intercept application 1406 requests a connection to the previously opened document 1308 using the document identifier contained in the dummy ".adt" file. If successful, this method returns another pointer to a second interface called ICell. The ICell interface is associated with one particular secured document that the external control agent 402 is handling. Through ICell the intercept application 1406 negotiates with the external control agent 402 for various user actions that may be intercepted as well as retrieval of the original document data wrapped in the document 1308.

Using the method GetStaticPermissions( ) on the ICell interface, the intercept application 1406 retrieves a static Boolean value, indicating whether the document 'open' action is permitted or is true, if so the process continues. In one embodiment, for example, the action is permitted if the user had purchased access to the document. In this example, the external control agent 402 intercepts the action and determines whether the user has purchased access to the document. This determination may be accomplished by verifying that the user identification appears in an accessible database of authorized users. Alternatively, the external control agent may activate the display of a screen prompting the user to make some form of payment before the action can be implemented.

Next, at a state 1512, the intercept application 1406, which is a DIT, identifies the document server application 1304 (FIG. 14), that actually performs the data processing regarding the document 1308. For example, if the document 1308 is an HTML Web page, the intercept application 1406 identifies Microsoft's MSHTML module as the Active Document Server for the document 1308. The document server application 1304 is identified by the return value of another call to the GetStaticPermissions( ) method. The intercept application 1406 starts the document server application 1304 as an Active Document Server, the intercept application 1406 itself acting as an Active Document Container for the document server application 1304. This is performed through standard COM calls available from the operating system.

Moving to a state 1514, the external control agent 402 returns the intercept application 1406 a static permission flag for each possible remaining intercept action, i.e., edit, print, save and copy, through another call to GetStatic Permissions( ) from the intercept application 1406 which specifically requests these permissions.

Moving to a state 1516, the document server application 1304 is allowed to open the contents of document 1308. To do this, the intercept application 1406 passes the actual document contents to the document server application 1304. Assuming the document had been encrypted, the external control agent 402 decrypts the document 1308 when it initially opens the document 1308. The intercept application 1406 determines the location of the decrypted copy of the document 1308, through a return value of another data identifying call to the GetStaticPermissions( ) method. The intercept application 1406 passes the decrypted data to the document server application 1304 either by retrieving the data from the external control agent 402 and passing it as a new file or memory object, or telling the document server application 1304 the location of the decrypted data held by the external control agent 402.

Continuing to a state 1518, the user accesses the document 1308 subject to the conditions imposed by the DCL 400 and the external control agent 402. When a user action is intercepted, e.g., attempting to edit a file, the intercept application 1406 applies the usage rules that have been provided by the external control agent 402 to determine whether the action is allowed. If the static permission flag for the selected action is set to false, the action is immediately vetoed. Also, a message is sent to the user indicating the action is not permitted. For example, the external control agent 402 may intercept a user action and require some form of payment before permitting implementation of the user action. Further examples of how the external control agent 402 may monitor and augment implementation of user actions are discussed below. To ensure proper operation of the hosting application 1302 that initiated the action, an appropriate return code is sent to the hosting application 1302, generally indicating that the action was completed successfully.

If the permission flag is true, the external control agent 402 is invoked to perform any further negotiation that is required. This is required only for the action of printing the document in this particular embodiment of the current invention and is hard-coded into the intercept application 1406 embodiment of DCL 400. For such intercepted print actions, another method of ICell named GetDynamicPermission( ) is called. This is an augmentation function of the present invention where the user may be required to make a payment each time a document printout is requested. The specific augmentation process is determined by the external control agent 402 according to the publisher defined rules associated with the document 1308. If the user properly fulfills the publisher requirements for printing, if any, the method GetDynamicPermission( ) returns true and the printing action is allowed to proceed. If not, the return value is false and the action is vetoed and not allowed to proceed.

Note that the external control agent 402 may implement a monitoring process for all print actions, if such monitoring were desired. For example, if the user wants to print the document 1308, the external control agent 402 may require that a nominal fee be paid. If a payment is made, the external control agent 402 allows the printing to proceed. If the user does not pay the required fee, the external control agent 402 denies the print request.

As further examples of monitoring actions, the external control agent 402 may audit user actions taken on the document 1308 by recording the type of action and frequency of that action. Moreover, the external control agent 402 may compile statistics of the types and frequency of user actions based on this collected audited information. Additionally, the external control agent may record the computational efficiency of the document server application 1304 for performing certain user actions and similarly compile statistics on these computed efficiencies.

As further examples of augmenting actions, the external control agent 402 may add security features to the document server application 1304 or the document 1308 in order to restrict their use to authorized users. Moreover, as discussed above, the external control agent may facilitate the purchase or payment for the use of the document 1308 or the document server application 1304. Additionally, the external control agent 402 may trigger the display of advertisements upon the hosting application 1302, activate a help system on specific user actions (or action patterns), provide audible or visual feedback to user actions, and archive a printing history of the document 1308.

The external control agent 402 may also activate actions which both monitor and augment the user actions. For example, the external control agent 402 may use monitoring information in order to customize a user assistance program which can provide feedback to a user when a pre-defined usage statistic or pattern is repeated. For example, a user may be notified that only a limited number of permissible document actions are authorized.

Finally, at a state 1520, the DCL 400 stops executing and awaits further actions by the user.

A second embodiment is possible which utilizes the same components as depicted in FIG. 14 but using an alternate flow from that depicted in FIG. 15. In this second scenario the document 1308 is created the same way. This time, however, the file extension is assigned to that associated with the intercept application 1406 directly, rather than to the external control agent 402. Now when a user is using Internet Explorer and the document 1308 is selected at some web site, Internet Explorer as the hosting application 1302 immediately loads the intercept application 1406 and passes the selected document 1308 to the intercept application 1406.

Next, the intercept application 1406 starts the external control agent 402, passing it the document 1308. This is performed through a shell execution standard to the windows operating system. The external control agent 402 opens the document 1308 and processes its rules and determines if the document 1308 may be opened as in the previous embodiment. Note that in this case the intercept application 1406 is already loaded and is associated with the instance of the hosting application 1302 the user was already working in.

If the document may be opened, as determined by the publisher defined rules within document 1308, the external control agent 402 sends a dummy file of exactly the same form as in the previous description to a predetermined location on the system. The intercept application 1406 opens and reads the dummy file when it finally appears. The intercept application also knows the predetermined location where the external control agent 402 will deposit the dummy file. The intercept application now makes a connection to the external control agent 402 as before, using a CoCreateInstance( ) call to retrieve the IFramework interface.

The intercept application 1406 now uses the document identifier from the dummy file to make the call to the method AttachToCell( ) in the IFramework interface, retrieving an ICell interface to the document 1308 in the external control agent 402. After this interface is obtained, the intercept application removes the dummy file from the system permanently.

From this point on everything proceeds as in the previous flow description of FIG. 15, from state 1512 onward. This particular embodiment takes advantage of the fact that Internet Explorer is the original application that a user is in when first selecting the document 1308. This embodiment provides a very transparent security implementation to the user. If open rights are permitted, the document server application 1304 is loaded by the intercept application 1406 and the document appears a short time after the user selected the document 1308, in the same window the user originally selected the document from.

Advantageously, this invention discloses a system and a method which provide control rights to digital objects created by legacy applications and allow an external control object to monitor user actions according to these control rights. As a result, digital objects created by legacy applications which normally could not be managed by control rights may be controlled by implementation of this invention. Moreover, this invention achieves this control without affecting the functionality of either the container application or the server application. By seamlessly intercepting and monitoring user actions directed toward the digital object, this invention can control the access and use of the digital object and the legacy application. Moreover, a significant usefulness of the present invention is the ability to alter the application and features of applications and components in ways and with features that had not originally been conceived at the time of implementation of such applications and components. This usefulness is demonstrated in the example embodiment of the present invention whereby security features and access control have been added to pre-existing applications and components written to the Microsoft defined Active Document Specification and the data and documents used by them.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention.

What is claimed is:

1. A method of intercepting a communication between two applications in a computer environment, the method comprising:
   intercepting by an intercept application a data communication between a first application and a second application within a client computer environment without changing the functionality of the first application and the second application;
   providing a digital object created by the second application;
   providing a control object capable of specifying a dynamic control logic depending on the intercepted data communication; and
   applying by the intercept application the dynamic control logic specified by the control object on the digital object.

2. The method of claim 1, wherein the first application and the second application communicate via a predefined communication channel.

3. The method of claim 1, wherein the control logic redirects the data communication to a third application.

4. The method of claim 1, wherein the control logic monitors the communication.

5. The method of claim 4, wherein the monitoring action comprises auditing user actions taken on a digital object by recording the type of action and frequency of that action.

6. The method of claim 4, wherein the monitoring action comprises computing the efficiency of the first application or the second application for performing certain user actions.

7. The method of claim 1, wherein the control logic augments information to the data communication.

8. The method of claim 7, wherein the augmenting action comprises authorizing user access and use of the digital object.

9. The method of claim 7, wherein the augmenting action comprises authorizing user access and use of the second application.

10. The method of claim 7, wherein the augmenting action comprises activating purchase requirements for user access and use of the digital object including presenting a display screen whereby the user can (i) confirm a previous payment or (ii) purchase control rights for access and use of the digital object.

11. The method of claim 7, wherein the augmenting action comprises activating purchase requirements for user access and use of the second application including presenting a display screen whereby the user can (i) confirm a previous payment or (ii) purchase control rights for access and use of the second application.

12. The method of claim 7, wherein the augmenting action comprises displaying advertisements upon particular application communications.

13. The method of claim 7, wherein the augmenting action comprises executing a help program on specific application communications.

14. The method of claim 7, wherein the augmenting action comprises rendering audible or visual feedback to user actions implemented on the digital object or the second application.

15. The method of claim 7, wherein the augmenting action comprises archiving a history of the user actions implemented on the digital object or the second application.

16. The method of claim 7, wherein the augmenting action comprises customizing a user assistance program based on information related to the data communication and collected by the control object, wherein the user assistance program can render audible or visual feedback to a user when one or more pre-defined user actions are repeated.

17. A method of embedding a control object into a hosting application as an interface to determine control rights of a digital object, the method comprising:
   providing the digital object created by a document server application in communication with the hosting application;
   activating the control object to open the digital object and to read the control rights associated with the digital object;
   intercepting user actions between the hosting application and the document server application within a client computer environment by an intercept application;
   monitoring by the control object user actions intercepted by the intercept application, wherein the control object specifies a dynamic control logic depending on the intercepted user actions and the control rights; and
   authorizing a user to implement the user actions on the digital object according to the control rights.

18. The method of claim 17, wherein the hosting application comprises an Internet browser application.

19. A system embedded in a computer readable storage medium for embedding a control object into a hosting application as an interface to determine control rights of a digital object and to monitor user actions, the system comprising:
   the control object which monitors a plurality of user actions and authorizes implementation of the user actions on the digital object according to the control rights and a dynamic control logic specified by the control object;
   a hosting application which activates the control object to open the digital object and to read the control rights associated with the digital object;
   a document server application for creating the digital object; and
   an intercept application which intercepts the user actions between the hosting application and the document server application within a client computer environment, mimics the functionality of the document server application, and performs the user actions on the digital object.

* * * * *

UNITED STATES PATENT AND TRADEMARK OFFICE
CERTIFICATE OF CORRECTION

PATENT NO. : 7,650,418 B2
APPLICATION NO. : 10/928472
DATED : January 19, 2010
INVENTOR(S) : Benson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this

Twenty-third Day of November, 2010

David J. Kappos
*Director of the United States Patent and Trademark Office*